United States Patent
Dyllick-Brenzinger et al.

(10) Patent No.: US 8,324,305 B2
(45) Date of Patent: Dec. 4, 2012

(54) PROCESS FOR THE HOMOGENEOUS INCORPORATION OF POLYMER PARTICLES INTO POLYMERIC MATRICES

(75) Inventors: Rainer Dyllick-Brenzinger, Neustadt (DE); Alban Glaser, Mannheim (DE); Samira Nozari, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/002,515

(22) PCT Filed: Jul. 3, 2009

(86) PCT No.: PCT/EP2009/058395
§ 371 (c)(1),
(2), (4) Date: Jan. 4, 2011

(87) PCT Pub. No.: WO2010/000833
PCT Pub. Date: Jan. 7, 2010

(65) Prior Publication Data
US 2011/0105660 A1    May 5, 2011

(30) Foreign Application Priority Data
Jul. 4, 2008  (EP) ................................ 08159697

(51) Int. Cl.
*C08K 5/01*  (2006.01)
*C08K 5/16*  (2006.01)

(52) U.S. Cl. ........................ 524/487; 524/186
(58) Field of Classification Search .............. 524/487
See application file for complete search history.

(56) References Cited

U.S. PATENT DOCUMENTS

| | | | |
|---|---|---|---|
| 5,931,997 A * | 8/1999 | Babler ........................ 106/410 |
| 6,160,049 A | 12/2000 | Mathauer et al. |
| 6,605,658 B1 | 8/2003 | Broussard et al. |
| 6,727,318 B1 | 4/2004 | Mathauer et al. |
| 2002/0131941 A1 * | 9/2002 | Habeck et al. ................. 424/63 |
| 2003/0199628 A1 | 10/2003 | Weese et al. |
| 2006/0009571 A1 | 1/2006 | Dyllick-Brenzinger et al. |
| 2006/0058430 A1 | 3/2006 | Dyllick-Brenzinger et al. |
| 2007/0218089 A1 * | 9/2007 | Dyllick-Brenzinger et al. ........................ 424/401 |
| 2008/0146448 A1 | 6/2008 | Dyllick-Brenzinger et al. |
| 2008/0171658 A1 | 7/2008 | Dyllick-Brenzinger et al. |

FOREIGN PATENT DOCUMENTS

| | | |
|---|---|---|
| DE | 196 28 143 | 1/1998 |
| DE | 103 35 863 | 3/2005 |
| EP | 1 110 999 | 6/2001 |
| EP | 1 191 041 | 3/2002 |
| SE | 7909585 | 5/1981 |
| WO | 99 40123 | 8/1999 |
| WO | 2004 037867 | 5/2004 |
| WO | 2004 046234 | 6/2004 |
| WO | 2006 094526 | 9/2006 |
| WO | 2006 094978 | 9/2006 |

OTHER PUBLICATIONS

Christie, Waxes in AOCS Lipid Library, Mar. 2012.*
U.S. Appl. No. 13/147,083, filed Jul. 29, 2011, Glaser, et al.
International Search Report issued Sep. 30, 2009 in PCT/EP09/058395 filed Jul. 3, 2009.

* cited by examiner

*Primary Examiner* — Hui Chin
(74) *Attorney, Agent, or Firm* — Oblon, Spivak, McClelland, Maier & Neustadt, L.L.P.

(57) ABSTRACT

The invention relates to preparations comprising a wax in which polymer particles are present, where the polymer particles comprise at least one effect substance, obtainable by, by means of a miniemulsion polymerization carried out in the presence of a wax-immiscible solvent, distributing at least one effect substance in polymer particles, and incorporating the polymer particle dispersion obtained in this way into a wax by phase transfer.

Furthermore, the invention relates to compositions comprising a polymeric matrix in which, in essentially homogeneous distribution, the aforementioned polymer particles are present, obtainable by incorporating the aforementioned polymer-particle-comprising wax as preparation into a polymeric matrix.

20 Claims, 1 Drawing Sheet

Fig. 1 – Microtome first-cut of a PE film which has been prepared using the preparation from example 3. The very good distribution of the particles in the film can be seen very well.
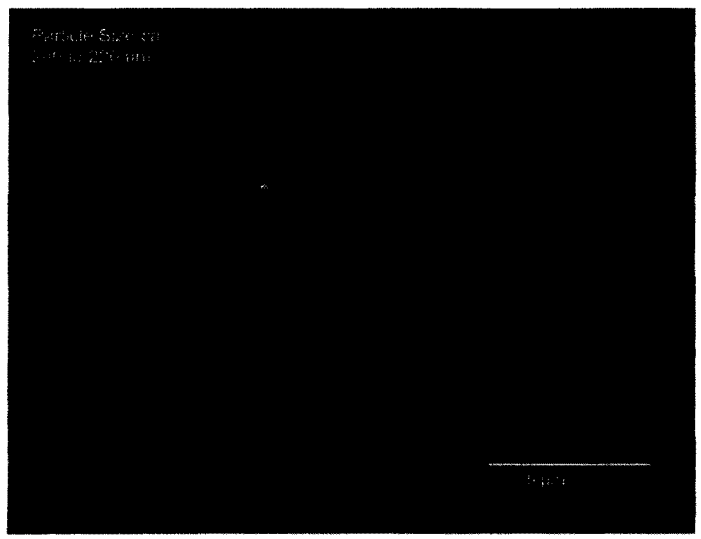
Fig. 2 – Microtome first-cut of a PE film which comprises a kneaded-in powder prepared according to the direction from example 2. The agglomerates are highly visible.
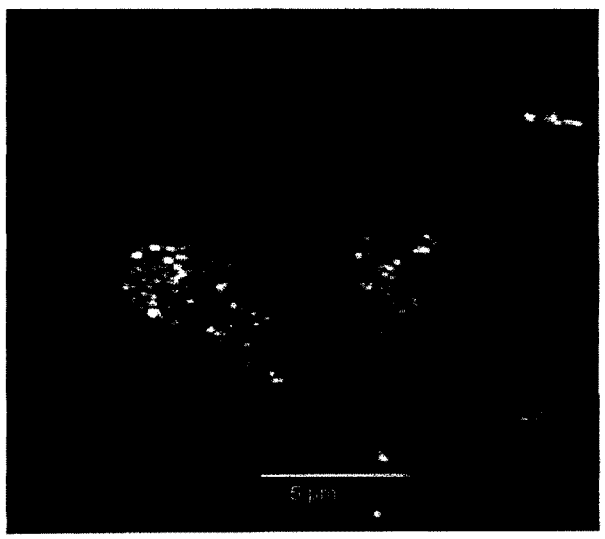

PROCESS FOR THE HOMOGENEOUS INCORPORATION OF POLYMER PARTICLES INTO POLYMERIC MATRICES

CROSS-REFERENCE TO RELATED APPLICATIONS

This application is a U.S. National Stage Application of PCT/EP2009/058395, filed on Jul. 3, 2009, the text of which is incorporated by reference, and claims priority to European Patent Application No. 08159697.5, filed on Jul. 4, 2008, the text of which is also incorporated by reference.

The invention relates to a preparation in which polymer particles are present, where the polymer particles comprise at least one effect substance, which are obtainable by, by means of a miniemulsion polymerization carried out in the presence of a wax-immiscible solvent, distributing at least one effect substance in polymer particles, and incorporating the polymer particle dispersion obtained in this way into a wax by phase transfer.

The invention further relates to a composition comprising a polymeric matrix in which, in essentially homogeneous distribution, polymer particles are present, where the polymer particles comprise at least one effect substance, obtainable by then incorporating the preparation described above into a polymeric matrix.

The invention further relates to a method for preparing an above-described preparation.

The invention further relates to a method for preparing an above-described composition. Moreover, the invention relates to films, fibers and moldings obtainable using the above-described composition.

Preferred embodiments can be found in the description and the claims and also the examples.

Combinations of preferred embodiments do not depart from the scope of the invention.

Preparations and compositions comprising polymer particles comprising at least one effect substance and their preparation are known per se. Thus, for example, polymer particles comprising UV absorbers are incorporated into plastics in order to protect them from UV radiation. However, it is also likewise possible to distribute other substances that are per se difficult to mix with plastics into polymer particles in order, in so doing, to ensure a migration-stable distribution within the plastic.

DE 103 35 863 deals with a continuous process for producing a pigment masterbatch by extrusion, where the pigments are added in the form of a dispersion or a pressed cake to a molten polymer and incorporated by means of shear forces. The pigment masterbatch produced in this way is available for subsequent incorporation into polymeric matrices.

US 2003/0199628 describes an aqueous additive system for polymeric matrices. In this system, polymer particles comprising for example impact modifiers and if appropriate further components such as UV absorbers are produced by means of emulsion polymerization. These can be incorporated directly into a polymeric matrix as aqueous suspension or as moist pressed cake or be added as powder mixture together with other effect substances, which are then incorporated into the polymeric matrix.

WO 2004/046234 describes the preparation of polymer particles comprising UV absorber by means of miniemulsion polymerization. The polymer particles obtained in this way are used for stabilizing plastics against UV radiation, reference being made in general to various methods, known per se to the person skilled in the art, for incorporating the polymer particles into the polymeric matrix. For example, the addition to a polymeric matrix can take place through incorporation of the polymer particles into a preparation and the subsequent addition of this preparation to the polymeric matrix.

SE 7909585 describes a process for preparing masterbatches through the incorporation of aqueous pigment pressed cakes or other additives into an organic carrier, namely an organic carrier comprising polybutene. These masterbatches are then incorporated into various polymeric matrices.

Homogeneous incorporation of effect substances into polymeric matrices is economically advantageous since qualitative improvement of the products prepared from the polymeric matrices is achieved. In the case of inhomogeneous incorporations, in which the effect substances agglomerate, relatively large amounts of effect substances have to be incorporated into a polymeric matrix in order to achieve the same effect as in the case of a homogeneous incorporation. A method for the particularly problematic homogeneous incorporation of effect substances into polymeric matrices with which they cannot be easily mixed, is described in WO 2004/046234. Here, effect substances are distributed in polymer particles which for their part can be mixed.

It was therefore an object of the present invention to provide preparations which comprise polymer particles, where the polymer particles comprise at least one effect substance, and also to provide compositions which comprise these polymer particles in essentially homogeneous distribution which have been prepared using these preparations.

BRIEF DESCRIPTION OF THE SEVERAL VIEWS OF THE DRAWINGS

FIG. 1: Two-photon laser microscopy of a 100 μm film polyethylene (PE) film produced with the preparation of Example 3, which demonstrates a very good distribution of the polymer particles in the PE film.

FIG. 2: Two-photon laser microscopy of a comparative 100 μm polyethylene (PE) film comprising a kneaded-in powder prepared according to Example 2, which demonstrates a poor distribution of the polymer particles in the PE film.

This object is achieved through the provision of preparations which comprise polymer particles, where the polymer particles comprise at least one effect substance, and also through compositions in which these polymer particles are present in essentially homogeneous distribution, which are obtainable by a) by means of a miniemulsion polymerization carried out in the presence of a wax-immiscible solvent, distributing at least one effect substance in a polymer A,
b) incorporating the polymer particle dispersion obtained in this way into a wax by phase transfer,
c) using the wax obtained in this way as preparation, which
d) is then incorporated into a polymeric matrix.

The preparation obtained under c) can optionally be dried and pulverized prior to further processing, or the still-moist product can be incorporated into a polymeric matrix at temperatures above the boiling point of the wax-immiscible solvent.

In one embodiment of the composition according to the invention, the polymeric matrix comprises a polyolefin.

In a further embodiment of the composition according to the invention, at least one effect substance is a UV absorber or a HALS (hindered amine light stabilizer).

In a further embodiment of the composition according to the invention, the wax has a molar mass of from 500 to 50 000, preferably 1000 to 20 000 and particularly preferably 2000 to 10 000.

The polymer particles present in the composition according to the invention are obtainable by miniemulsion polymerization.

Preferred polymeric matrices into which the polymer particles according to the invention comprising at least one effect substance are incorporated are, in the process according to the invention, polyolefins, polyesters, PVC, polycarbonates, polyamides, polyurethane, polymethyl methacrylate (PMMA), polystyrene or copolymers of the aforementioned polymers. Mixtures of different aforementioned polymers can likewise form the polymeric matrix. The polymeric matrix is particularly preferably a polymer comprising polyolefin or PVC. In a very particularly preferred process, the polymeric matrix is a polyolefin. In an especially preferred process, the polymeric matrix is a polyethylene, for example a low density polyethylene (LDPE).

In the present application, the term "essentially homogeneous distribution" means that the polymer particles are distributed evenly and uniformly within the entire preparation and the polymeric matrix, i.e. that the individual polymer particles are not present in agglomerated form, but are separate from one another. Within the context of this invention, a distribution of the polymeric particles in the polymeric matrix of LDPE is, for example, to be regarded as "essentially homogeneous" when fewer than 10%, preferably fewer than 5%, of the polymer particles has a shorter distance to the closest polymer particle of at least 50 nm, preferably at least 100 nm, further preferably at least 250 nm and especially preferably at least 500 nm.

The distribution of the particles can be investigated, for example, using confocal laser scanning microscopy. The method is described, for example, in "Confocal and Two-Photon Microscopy", edited by Alberto Diaspro; ISBN 0-471-40920-0, Wiley-Liss, a John Wiley & Sons, Inc. Publication, in Chapter 2, pages 19-38, and the citations therein.

The dispersions of polymer particles comprising at least one effect substance incorporated into the composition according to the invention are prepared by means of miniemulsion polymerization.

The preparation of miniemulsions is known per se and is described in general terms in Landfester, K. (2001) Macromolecular Rapid Communication, Vol. 22, pages 896-936 and in WO 2004/037867. These are understood as meaning particularly finely divided emulsions of hydrophobic monomers in water. The particle size of the monomers emulsified in the aqueous phase is in the nanometer range, e.g. 5 to 500 nm. In order, for example, to prepare a miniemulsion of styrene in water, ultrasound is left to act, for the homogenization, on a mixture of styrene, a surface-active agent such as sodium dodecyl sulfate and a hydrophobic constituent such as hexadecane or olive oil. This gives stable miniemulsions of styrene and hydrophobic agent in water with an average drop diameter of the emulsified oil phase of, for example, 78 to 102 nm, cf. K. Landfester, Macromol. Rapid Commun. Vol. 22, 896-936 (2001). In an ideal case, these emulsions can be polymerized to give polymer latices while retaining the drop size of the emulsified monomer droplets. During the miniemulsion polymerization, it is possible to incorporate water-insoluble compounds such as alkyd resins or pigments into the latices which form.

The essential feature of the miniemulsion polymerization is that an organic phase is distributed in a particularly finely divided manner in an aqueous phase which comprises a surface-active agent and also a hydrophobic agent for stabilizing the miniemulsion. The average drop diameter of the drops emulsified in the aqueous phase is, for example, in the range from 50 to 500 nm, preferably 50 to 200 nm and in particular 50 to 100 nm. The average drop diameter of the drops emulsified in the aqueous phase can of course also be less than 100 nm, but not less than 10 nm. Ideally, during the miniemulsion polymerization, the particle size of the emulsified particles or droplets virtually does not change during the polymerization, meaning that the average particle size of the polymers which are present in the aqueous polymer dispersions is likewise in the range stated for the emulsified organic phase. Besides the pure miniemulsion polymerization, an emulsion polymerization is in practice also observed as a competing reaction. The molar masses of the polymers are similar to those in the case of the emulsion polymerization in the range from 0.3 to 10 million daltons.

Such small particle sizes of at most 500 nm are achieved when the organic phase used to prepare the emulsion is emulsified with the help of mechanical emulsifying methods. Such methods are known. They are described in detail, for example, by H. Schubert et al., in "Mischen und Rühren—Grundlagen und moderne Verfahren für die Praxis [Mixing and stirring—Fundamentals and modern methods in practice]", VDI conference, 23./24.11.1988, Baden-Baden, under "New developments in the field of emulsifying technology". The apparatuses used in the mechanical emulsifying methods are, for example, high-pressure homogenizers, ultrasound-generating devices, microfluidizers, rotor-stator apparatuses, Taylor reactors, Cuette cells, jet nozzles and apparatuses operating with membrane technology. The essential principle of these devices is based on the fact that high shear fields are built up in them in the short term. The emulsification of the organic phase in the aqueous phase preferably takes place with the help of ultrasound-generating devices or with the help of high-pressure homogenizers.

Suitable hydrophobic monoethylenically unsaturated monomers which can be polymerized by a miniemulsion polymerization are, for example, monomers from the group styrene, methylstyrene, $C_2$-to $C_{28}$-olefins, esters of monoethylenically unsaturated carboxylic acids having 3 to 5 carbon atoms and monohydric alcohols having 1 to 22 carbon atoms, vinyl esters of $C_1$-to $C_{22}$-carboxylic acids, preferably of $C_1$-to $C_{18}$-carboxylic acids, vinyl ethers of $C_1$-to $C_{30}$-alcohols, acrylonitrile and methacrylonitrile. Preferably used monomers from this group are styrene, methyl methacrylate, n-butyl acrylate, isobutyl acrylate, tert-butyl acrylate and acrylonitrile or mixtures of these monomers. The hydrophobic monomers can be used for the modification of the properties of the resulting polymer dispersions if appropriate together with small amounts of hydrophilic monomers. The hydrophilic monomers, however, are used at most in an amount such that the resulting copolymers have a solubility in water at a temperature of 20° C. and a pH of 2 of at most 50 g/l, preferably of at most 10 g/l, in particular 1 g/l. Suitable hydrophilic compounds belong, for example, to the group of ethylenically unsaturated carboxylic acids having 3 to 5 carbon atoms, acrylamide, methacrylamide, N-vinylformamide, N-vinylpyrrolidone, N-vinylimidazole, vinyl ethers, 2-acrylamido-2-methylpropanesulfonic acid, vinylsulfonic acid, styrenesulfonic acid, sulfopropyl acrylate, sulfopropyl methacrylate, fumaric acid, maleic acid, itaconic acid and/or maleic anhydride.

Preferred hydrophilic monomers are, for example, acrylic acid, methacrylic acid, 2-acrylamido-2-methylpropanesulfonic acid, vinylsulfonic acid, maleic anhydride and/or maleic acid.

A large number of effect substances which can be incorporated into a polymeric matrix is known per se to the person skilled in the art. The polymer particles according to the invention comprising at least one effect substance can comprise any desired effect substances, for example UV absorbers, organic dyes which absorb light in the visible region, IR absorbers, optical brighteners, stabilizers and auxiliaries for organic polymers, antioxidants for polymers, antifogging agents for polymers, lubricants for polymers, antistats for polymers, flame retardants for polymers, reactive sizes for paper, pharmaceutical active ingredients, biocides and agrochemical active ingredients and combinations of two or more such effect substances. The contemplated effect substances are soluble, partially soluble or else readily dispersible in the ethylenically unsaturated monomers.

Preferably, the effect substances used are UV absorbers. A list of possible UV absorbers can be found, for example, in WO2004/046234.

As is known, UV absorbers are understood as meaning compounds that absorb UV rays and that deactivate the absorbed radiation in a nonradiative manner. UV absorbers absorb light of wavelength <400 nm and convert it to heat radiation. Such compounds are used, for example, in sunscreen compositions and for stabilizing organic polymers. Examples of UV absorbers are derivatives of p-aminobenzoic acid, in particular esters thereof, e.g. ethyl 4-aminobenzoates and ethoxylated ethyl 4-aminobenzoates, salicylates, substituted cinnamic acid esters (cinnamates), such as octyl p-methoxycinnamate and 4-isopentyl 4-methoxycinnamate, 2-phenylbenzimidazole-5-sulfonic acid and its salts. A particularly preferably used UV absorber is 4-n-octyloxy-2-hydroxybenzophenone.

Further examples of UV absorbers are: substituted acrylates, such as, for example, ethyl or isooctyl α-cyano-β,β-diphenylacrylate (primarily 2-ethylhexyl α-cyano-β,β-diphenylacrylate methyl α-methoxycarbonyl-β-phenylacrylate, methyl α-methoxycarbonyl-β-(p-methoxyphenyl)acrylate, methyl or butyl α-cyano-β-methyl-β-(p-methoxyphenyl)acrylate, N-(β-methoxycarbonyl-β-cyanovinyl)-2-methylindoline, octyl p-methoxycinnamate, isopentyl 4-methoxycinnamate, urocanic acid and salts and esters thereof;

2-hydroxybenzophenone derivatives, such as, for example, 4-hydroxy-, 4-methoxy-, 4-octyloxy-, 4-decyloxy-, 4-dodecyloxy-, 4-benzyloxy-, 4,2',4'-trihydroxy-, 2'-hydroxy-4,4'-dimethoxy-2-hydroxybenzophenone, and 4-methoxy-2-hydroxybenzophenonesulfonic acid sodium salt;

esters of 4,4-diphenylbutadiene-1,1-dicarboxylic acid, such as, for example, the bis(2-ethylhexyl) ester; 2-phenylbenzimidazole-4-sulfonic acid, and 2-phenylbenzimidazole-5-sulfonic acid and salts thereof;

derivatives of benzoxazoles;

derivatives of benzotriazoles and 2-(2'-hydroxyphenyl)benzotriazoles, such as, for example, 2-(2H-benzotriazol-2-yl)-4-methyl-6-(2-methyl-3-((1,1,3,3-tetramethyl-1-(trimethylsilyloxy)disiloxanyl)propyl)phenol, 2-(2'-hydroxy-5'-methyl phenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-[3',5'-bis(α,α-dimethylbenzyl)-2'-hydroxyphenyl]benzotriazole, tert-butyl-5'-(2-(2-ethylhexyloxy)carbonylethyl)-2'-hydroxyphenyl]-5-chlorobenzotriazole, 2-[3'-tert-butyl-2'-hydroxy-5'-(2-methoxytriazole-2-[3'-tert-butyl-2'-hydroxy-5'-(2-methoxycarbonylethyl)phenyl] benzotriazole, 2-[3'-tert-butyl-2'-hydroxy-5'-(2-octyloxycarbonylethyl)phenyl]benzotriazole, 2-[3'-tert-butyl-5'-(2-(2-ethylhexyloxy)carbonylethyl)-2'-hydroxyphenyl]benzotriazole, 2-(3'-dodecyl-2'-hydroxy-5'-methylphenyl)benzotriazole, 2-[3'-tert-butyl-2'-hydroxy-5'-(2-isooctyloxybornylethyl) phenylbenzotriazole, 2,2'-methylenebis[4-(1,1,3,3-tetramethylbutyl)-6-benzotriazol-2-ylphenol], the completely esterified product of 2-[3'-tert-butyl-5'-(2-methoxycarbonylethyl)-2'-hydroxyphenyl]-2H-benzotriazole with polyethylene glycol 300, [R—CH$_2$CH$_2$—COO (CH$_2$)$_3$-]$_2$ where R is 3'-tert-butyl-4-hydroxy-5'-2H-benzotriazol-2-ylphenyl, 2-[2'-hydroxy-3'-(α,α-dimethylbenzyl)-5'-(1,1,3,3-tetramethylbutyl)phenyl] benzotriazole, 2-[2'-hydroxy-3'-(1,1,3,3-tetramethylbutyl)-5'-(α,α-dimethylbenzyl)phenyl] benzotriazole;

benzylidenecamphor and its derivatives, as are specified, for example, in DE-A 3 836 630, e.g. 3-benzylidenecamphor, 3-(4'-methylbenzylidene)-d-1-camphor; α-(2-oxoborn-3-ylidene)toluene-4-sulfonic acid and its salts, N,N,N-trimethyl-4-(2-oxoborn-3-ylidenemethyl)anilinium methosulfate;

dibenzoylmethanes, such as, for example, 4-tert-butyl-4'-methoxydibenzoylmethane; 2,4,6-triaryltriazine compounds such as 2'4',6-tris{N-[4-(2-ethylhex-1-yl)oxycarbonylphenyl]amino}-1,3,5-triazine, bis(2'-ethylhexyl) 4'4'-((6-(((tert-butyl)aminocarbonyl)phenylamino)-1,3,5-triazine-2,4-diyl)imino)bisbenzoate; and 2-(2-hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis-(2,4-dimethylphenyl)-1,3,5-triazine, 2-(2-hydroxy-4-tridecyloxyphenyl)-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxy-4-methoxyphenyl)-4-(4-methoxyphenyl)-6-phenyl-1,3,5-triazine, 2-{2-hydroxy-4-[3-(2-ethylhexyl-1-oxy)-2-hydroxypropyloxy] phenyl}-4,6-bis(2,4-dimethylphenyl)-1,3,5-triazine.

Further suitable UV absorbers can be found in the publication Cosmetic Legislation, Vol. 1, Cosmetic Products, European Commission 1999, pp. 64-66, to which reference is hereby made.

Moreover, suitable UV absorbers are described in lines 14 to 30 on page 6 of EP A-1 191 041.

Other effect substances are organic dyes and optical brighteners which in each case dissolve in ethylenically unsaturated monomers and which themselves are not polymerizable and which, even under the conditions of free-radical polymerization, are not decomposed or converted, or are reactive. Such dyes and optical brighteners are described in detail in WO-A-99/40123, page 10, line 14 to page 25, line 25, to which reference is again expressly made here. Whereas organic dyes have an absorption maximum in the wavelength range from 400 to 850 nm, optical brighteners have one or more absorption maxima in the range from 250 to 400 nm. As is known, upon irradiation with UV light, optical brighteners emit fluorescent radiation in the visible region. Examples of optical brighteners are compounds from the classes of bisstyrylbenzenes, stilbenes, benzoxazoles, coumarins, pyrenes and naphthalenes. Standard commercial optical brighteners are sold under the names Tinopal® (Ciba), Ultraphor® (BASF Aktiengesellschaft) and Blankophor® (Bayer). Furthermore, optical brighteners are described in Römpp, 10th Edition, Volume 4, 3028-3029 (1998) and in Ullmanns, Encyclopedia of Industrial Chemistry, Vol. 24, 363-386 (2003).

Moreover, suitable effect substances are stabilizers for organic polymers. These are compounds which stabilize polymers against degradation upon the action of oxygen, light or heat. Such stabilizers are also referred to as antioxidants or as UV stabilizers and photostabilizers, cf. Ullmanns, Encyclopedia of Industrial Chemistry, Vol. 3, 629-650 (ISBN-3-527-30385-5) and EP-A-1 110 999, page 2, line 29 to page 38, line 29. Using such stabilizers it is possible to stabilize virtually all organic polymers, cf. EP-A-1 110 999, page 38, line 30 to page 41, line 35. This literature reference is also made part of the disclosure content of the present invention by reference. The stabilizers described in the EP application belong to the compound class of pyrazolones, of organic phosphites or phosphonites, of sterically hindered phenols and of sterically hindered amines (stabilizers of the so-called HALS type, cf. Römpp, 10th Edition, Volume 5, pages 4206-4207. Standard commercial stabilizers and auxiliaries are sold under the names Tinuvin® and Cyasorb® by Ciba and Tenox® by Eastman Kodak. Stabilizers and auxiliaries are described, for example, in Plastic Additives Handbook, 5th Edition, Hanser, ISBN 1-56990-295-X. The stabilizers and auxiliaries are soluble in ethylenically unsaturated monomers, with at least 1 g/l, preferably at least 10 g/l, dissolving at a temperature of 20° C. and a pressure of 1 bar.

Further suitable effect substances are IR dyes which are sold, for example, by BASF Aktiengesellschaft as Lumogen® IR, and also flame retardants which are described, for example, in Römpp, 10th Edition, pages 1352 and 1353 and also in Ullmanns, Encyclopedia of Industrial Chemistry, Vol. 14, 53-71. The contemplated flame retardants are soluble in ethylenically unsaturated monomers.

Effect substances should also be understood as meaning alkenylsuccinic anhydrides which are known, for example, as pulp sizes for paper and are used industrially on a large scale. Examples of such sizes are the isomeric 4-, 5-, 6-, 7-and 8-hexadecenylsuccinic anhydrides, decenylsuccinic anhydride, octenylsuccinic anhydride, dodecenylsuccinic anhydride and n-hexadecenylsuccinic anhydride, cf. also C. E. Farley and R. B. Wasser, The Sizing of Paper, Second Edition, (3), Sizing With Alkenyl Succinic Anhydride, TAPPI PRESS, 1989, ISBN 0-89852-051-7.

Moreover, effect substances which may be used are all pharmaceutical active ingredients which are soluble, partially soluble or dispersible in ethylenically unsaturated monomers. An overview of pharmaceutical active ingredients can be found, for example, in Römpp, 10th Edition, Volume 4, page 3235 (ISBN-3-13-734910-9) and in Ullmanns, Encyclopedia of Industrial Chemistry, Vol. 25, 549-579 (2003). In the present context, pharmaceutical active ingredients are also understood as meaning vitamins. Vitamins are soluble in ethylenically unsaturated monomers. A summary on vitamins can be found, for example, in Römpp, 10th Edition, Volume 6, pages 4877-4887 (1999) and in Ullmanns, Encyclopedia of Industrial Chemistry, Vol. 38, 109-294.

Further suitable effect substances are perfumes, cf. Ullmanns, Encyclopedia of Industrial Chemistry, Vol. 14, 73-199, and biocides, cf. Ullmanns, Encyclopedia of Industrial Chemistry, Vol. 5, 269-280.

The polymer particles which form during a miniemulsion polymerization usually comprise predominantly the at least one effect substance. In the process according to the invention, preferably 90% of the polymer particles comprise the at least one effect substance, particularly preferably 95%, very particularly preferably 99%. In the most preferred process, more than 99% of the polymer particles comprise the at least one effect substance.

In general, the effect substances are present in distributed form, i.e. not chemically bonded form, within the polymer. The effect substances can be surrounded by the polymer (core-shell particles) or adhere to the outside of the polymer particle (shell-core particles). Preferably, the particles are in the form of core-shell particles. Following completion of the miniemulsion polymerization, the polymer particles comprising at least one effect substance are present in the solvent as polymer dispersion. This dispersion can be incorporated directly into the wax according to the invention or the fraction of solvent can be reduced through evaporation. In the present process, the term dispersion can also be understood as meaning a pressed cake, even if in general no pressed cake is used. In a preferred embodiment, the dispersion upon incorporation into the wax comprises between 30 and 80% solvent; the dispersions according to the invention particularly preferably comprise between 50 and 70% solvent.

Waxes which are usually used for preparing preparations are known per se to the person skilled in the art. Thus, for example, it is possible to use pure PE waxes (e.g. Luwax A) or copolymers based on ethylene, vinyl acetate and/or meth-/acrylic acid or meth-/acrylates or oxidized PE waxes. In the process according to the invention, the waxes used are preferably oxidized PE waxes or copolymers based on ethylene and vinyl acetate; the wax is particularly preferably an oxidized PE wax.

The incorporation of dispersions into waxes normally takes place in a mixing apparatus. In the process according to the invention, the mixing apparatuses may be batch kneaders, dispersion kneaders or else extruders with mixing units. The incorporation of the dispersion according to the invention particularly preferably takes place in a batch kneader. Here, the temperature of the kneading mass, the ratio of the polymer dispersion to the wax, the applied shear and the shearing time are of importance. It is possible, when incorporating the polymer dispersion into the wax, to use a temperature program, whereby a slightly elevated temperature is used at the start and then the temperature is reduced in order to increase the viscosity of the mass. This improves the dispersion result.

The procedure preferably involves introducing the wax into the kneader for melting and then adding the dispersion in portions or in one go. The person skilled in the art is aware that the temperature should be chosen so that the wax melts, but the polymer particles and the effect substances present therein are not adversely affected. However, the wax can also be introduced into the mixing element in the form of a melt.

Preferably, a temperature of from 50 to 150° C. is chosen. Particularly preferably, the temperature in the mixing element is between 70 and 120° C.

Transfer of the polymer particles from the polar (for example aqueous environment) into the nonpolar environment of the wax phase is evident from the fact that water separates off which, depending on the temperature, escapes from the kneading mass in the form of liquid drops or else as water vapor.

As a result of the phase transition of the polymer particles comprising at least one effect substance from the dispersion into the wax, the preparation according to the invention is formed. The solvent can be separated off from the preparation in various ways. It may be stripped off or evaporated from the mixing element or the preparation can be removed from the mixing element and then dried and optionally ground. Preferably, in the process according to the invention, the solvent is removed as liquid by tipping.

If the solvent is removed through evaporation in the mixing element, it is necessary to choose a temperature in the mixing element which is above the boiling point of the solvent. At the same time, a low temperature in the process for incorporating the dispersion according to the invention into the wax is economically advantageous since the input of required energy is lower. Furthermore, lower temperatures are advantageous for the integrity of the polymer particles and the effect substances present therein. The person skilled in the art is aware that the boiling temperature of a solvent can be lowered through subatmospheric pressure. In the process according to the invention, the pressure in the mixing element is between 0.01 and 10 bar; preferably, the pressure is between 0.1 and 1 bar.

In the process according to the invention, following incorporation in the mixing element, the preparation is broken and comminuted and possibly dried in vacuo. In the process according to the invention, dry means a solvent content in the preparation of less than 5%. Preferably, the solvent content is less than 0.5%.

In general, preparations are comminuted for simplified handling and further processing. In this connection, the preparation can be granulated, pelleted or pulverized. In the process according to the invention, it is preferably pulverized.

The person skilled in the art is aware that processes can be carried out continuously or discontinuously. The preparation according to the invention of the preparation may also be carried out continuously or discontinuously. Preferably, the process is carried out discontinuously.

Preparations are normally used for incorporating effect substances into polymeric matrices. The preparation according to the invention is used in the present process in order to homogeneously incorporate the polymer particles comprising at least one effect substance present therein into polymeric matrices. The incorporation into a polymeric matrix can take place, for example, in one or more steps. Preferably, the incorporation takes place in one step.

The present invention of an improved process for the homogeneous incorporation of polymer particles into polymeric matrices permits the production of preparations, masterbatches and polymeric matrices prepared therefrom with considerably improved distribution of the incorporated particles. This improvement in the distribution has the advantage that the amount of polymer particles comprising at least one active ingredient that are to be incorporated into a preparation or a masterbatch can be reduced, and nevertheless at each point in the preparation or the masterbatch, an effective amount of the corresponding polymer particle comprising one or more active ingredients is present.

EXAMPLES

Example 1

Preparation of a Polymer Particle Dispersion 1

216 g of completely demineralized water, 0.27 g of a 15% strength sodium lauryl sulfate solution, and 13.5 g of pentaerythritol tetraacrylate were initially introduced with stirring (200 rpm). This emulsion was brought to a temperature of 80° C. with stirring, whereupon 82 g (feed 1) of a miniemulsion consisting of 256.5 g of methyl methacrylate, 13.5 of polyisobutene of molar mass 1000, 68.45 g of Uvinul® 3008, 5.4 g of a 15% strength aqueous solution of sodium lauryl sulfate and 476.4 g of completely demineralized water were added. 8.1 g (feed 2) of a 2% strength aqueous sodium peroxodisulfate solution were then added. The remainder of the miniemulsion 738.2 g was then metered in over a period of 60 minutes and the mixture was afterstirred for a further 30 minutes. Afterwards, the remainder of feed 2 (126.9 g) was metered in over the course of 60 minutes and then the mixture was afterstirred for a further 1 h. The mixture was cooled to room temperature (RT), and the polymer particle dispersion was filtered through a 500 µm or a 125 µm filter in order to determine the coagulate (3.5 g). The solids of the polymer particle dispersion was 29.9%. This polymer particle dispersion was used in examples 3 and 5 for preparing the preparations.

Example 2

Preparation of the Polymer Particle Dispersion 2

216 g of completely demineralized water, 0.27 g of a 15% strength sodium lauryl sulfate solution, and 13.5 g of pentaerythritol tetraacrylate were initially introduced with stirring (200 rpm). This emulsion was brought to a temperature of 80° C. with stirring, whereupon 82 g (feed 1) of a miniemulsion consisting of 256.5 g of methyl methacrylate, 12.825 g of stearyl acrylate, 68.45 g of Uvinul® 3008, 5.4 g of a 15% strength aqueous solution of sodium lauryl sulfate and 476.4 g of completely demineralized water were added. 8.1 g (feed 2) of a 2% strength aqueous sodium peroxodisulfate solution were then added. The remainder of the miniemulsion 738.2 g (feed 1) was then metered in over a period of 60 minutes and the mixture was afterstirred for a further 30 minutes. Afterwards, the remainder of feed 2 (126.9 g) was metered in over the course of 60 minutes and then the mixture was afterstirred for a further 1 h. The mixture was cooled to room temperature (RT), and the polymer particle dispersion was filtered through a 500 µm or a 125 µm filter in order to determine the coagulate (3.1 g). The solids was determined as 30.6%. This polymer particle dispersion was used in examples 4 and 6 for preparing the preparations.

Example 3

Preparing a Preparation

In a laboratory kneader from Jahnke and Kunkel with the designation HKD 0.6 D 71741, a mixture of 83.3 g of the polymer particle dispersion 1 and 75 g of Luwax EVA 3® (polyethylene wax based on a polar ethylene/vinyl acetate copolymer, see BASF Technical Information TI/ES 1474 e January 2005) was brought to a temperature of 90° C. After 3 h, clear water had separated off, which is a sign of complete phase transfer (flush process) of the polymer particles into the wax. Firstly, the kneader was allowed to cool and then the water was removed from the kneader and the chilled mass was broken into fragments. After drying and grinding, 98 g of a pulverulent preparation were obtained.

Example 4

Preparing a Preparation

The procedure was carried out analogously using polymer particle dispersion 2. For this, Luwax EVA 3® powder was again used.

Example 5

Preparing a Preparation

The procedure was carried out analogously using polymer particle dispersion 1. Now, however, instead of Luwax EVA 3® powder, Luwax OA2® powder (hard, oxidized polyethylene wax, cf. BASF Technical Information TI/ES 1098 e March 1991) was used.

Example 6

Preparing a Preparation

The procedure was carried out analogously using polymer particle dispersion 2. Luwax OA2® powder was again used.

Example 7

Preparation of a PE Film Using the Preparation from Example 3

A preparation prepared according to example 3 was kneaded in an extruder at 190° C. in Lupolen® 1840 D (low density polyethylene with a density of 0.919 g/cm² (ISO1183), see technical information from Basell dated 23.03.2004) and from this a 100 μm film was blown. Using 2-photon laser microscopy it was possible to visualize very well the very good disperse state, i.e. the very good distribution of the polymer particles in the PE. The image shown in FIG. 1 illustrates this.

Example 8

Preparation of a PE Film Using a Polymer Powder

As comparative example, a spray-dried powder was prepared according to the process of example 2 and subsequent spray-drying. This powder was kneaded in an extruder at 190° C. in Lupolen® 1840 D and from this a 100 μm film was blown. Using 2-photon laser microscopy it was possible to visualize very well the poor disperse state, i.e. the poor distribution of the polymer particles in the PE. The image shown in FIG. 2 illustrates this.

The invention claimed is:

1. A product, having a solvent content of less than 5%, and comprising:
 a wax selected from the group consisting of i) a polyethylene wax, ii) an oxidized polyethylene wax, and iii) a copolymer comprising, in polymerized form, ethylene and at least one selected from the group consisting of vinyl acetate, acrylic acid, methacrylic acid, an acrylate, and a methacrylate,
 wherein the wax comprises polymer particles comprising an effect substance, and
 wherein the wax is obtained by a process comprising:
 a) miniemulsion polymerizing monomers in the presence of the effect substance and a wax-immiscible solvent, to obtain a dispersion comprising the polymer particles, wherein the effect substance is distributed within the polymer particles;
 b) incorporating the polymer particles into the wax by phase transfer in a mixing apparatus, to obtain an intermediate product; and
 c) separating the solvent from the intermediate product, to obtain the product.

2. The product of claim 1, wherein the effect substance is an UV absorber.

3. The product of claim 1, wherein the wax has a molar mass in a range from 500 to 50,000 D.

4. A composition, comprising:
 a polymeric matrix comprising, in an essentially homogenous matrix, polymer particles comprising an effect substance,
 wherein the polymeric matrix is obtained by a process comprising:
 a) miniemulsion polymerizing monomers in the presence of the effect substance and a wax-immiscible solvent, to obtain a dispersion comprising the polymer particles, wherein the effect substance is distributed within the polymer particles;
 b) incorporating the polymer particles into a wax by phase transfer in a mixing apparatus and separating the solvent, to obtain a wax product comprising the particles and having a solvent content less than 5%; and then
 c) incorporating the wax product into the polymeric matrix.

5. The composition of claim 4, wherein the polymeric matrix comprises a polyolefin.

6. The composition of claim 4, wherein the effect substance is an UV absorber.

7. The composition of claim 4, wherein the wax has a molar mass in a range from 500 to 50,000 D.

8. A process for preparing a product, the process comprising:
 a) miniemulsion polymerizing monomers in the presence of a wax-immiscible solvent and an effect substance, to obtain a polymer particle dispersion, wherein the effect substance is distributed within the polymer particles;
 b) incorporating the polymer particle dispersion into a wax by phase transfer in a mixing apparatus, to obtain an intermediate product; and
 c) separating the solvent from the intermediate product, to obtain the product,
 wherein the product has a solvent content of less than 5%, and comprises the wax comprising the polymer particles comprising the effect substance.

9. The process of claim 8, wherein the effect substance is an UV absorber.

10. The process of claim 8, wherein the wax has a molar mass in a range from 500 to 50,000 D.

11. A process for preparing a composition, the process comprising:
 a) miniemulsion polymerizing monomers in the presence of a wax-immiscible solvent and an effect substance, to obtain a polymer particle dispersion, wherein the effect substance is distributed within the polymer particles;
 b) incorporating the polymer particle dispersion into a wax by phase transfer in a mixing apparatus and separating the solvent, to obtain a wax product comprising the polymer particles and having a solvent content of less than 5%; and then c) incorporating the wax product into a polymeric matrix, to obtain the composition, wherein the composition comprises the polymeric matrix comprising, in an essentially homogeneous distribution, the polymer particles comprising the effect substance.

12. The process of claim 11, wherein the polymeric matrix comprises a polyolefin.

13. The process of claim 11, wherein the effect substance is an UV absorber.

14. The process of claim 11, wherein the wax has a molar mass in a range from 500 to 50,000 D.

15. A film, fiber, or molding, comprising the composition of claim 4.

16. The composition of claim 4, wherein the wax is selected from the group consisting of i) a polyethylene wax, ii) an oxidized polyethylene wax, and iii) a copolymer comprising, in polymerized form, ethylene and at least one selected from the group consisting of vinyl acetate, acrylic acid, methacrylic acid, an acrylate, and a methacrylate.

17. The composition of claim 16, wherein the wax is a copolymer comprising, in polymerized form, ethylene and vinyl acetate.

18. The composition of claim 16, wherein the wax is an oxidized polyethylene wax.

19. The composition of claim 4, having a solvent content of less than 0.5%.

20. The composition of claim 4, wherein the polymeric matrix is a polyethylene matrix.

* * * * *